(12) United States Patent
Silverman et al.

(10) Patent No.: US 8,140,641 B2
(45) Date of Patent: Mar. 20, 2012

(54) MANAGING MEDIA SYNCHRONIZATION

(75) Inventors: Andrew L. Silverman, Redmond, WA (US); David Jones, Seattle, WA (US); John Zybura, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 12/271,648

(22) Filed: Nov. 14, 2008

(65) Prior Publication Data

US 2010/0125644 A1   May 20, 2010

(51) Int. Cl.
*G06F 15/16* (2006.01)
(52) U.S. Cl. ......... 709/217; 709/213; 709/219; 709/231
(58) Field of Classification Search .................. 709/231, 709/232, 230, 213, 217, 219
See application file for complete search history.

(56) References Cited

U.S. PATENT DOCUMENTS

| | | | |
|---|---|---|---|
| 2006/0069797 A1* | 3/2006 | Abdo et al. | 709/231 |
| 2006/0179464 A1* | 8/2006 | Park et al. | 725/95 |
| 2006/0194549 A1 | 8/2006 | Janik et al. | |
| 2006/0206533 A1 | 9/2006 | MacLaurin et al. | |
| 2006/0224620 A1 | 10/2006 | Silverman et al. | |
| 2006/0242259 A1 | 10/2006 | Vallabh et al. | |
| 2007/0239849 A1 | 10/2007 | Robbin et al. | |
| 2008/0086494 A1 | 4/2008 | Heller et al. | |
| 2008/0107102 A1* | 5/2008 | Kaufman et al. | 370/352 |
| 2008/0168526 A1 | 7/2008 | Robbin et al. | |
| 2009/0040289 A1* | 2/2009 | Hetherington et al. | 348/14.12 |
| 2009/0282088 A1* | 11/2009 | Thomas et al. | 707/201 |

FOREIGN PATENT DOCUMENTS

WO   2004075565 A1   9/2004

OTHER PUBLICATIONS

"Take Your Music and Video with You", Dated: Oct. 2005, Webpage available at :-http://www.microsoft.com/windows/windowsmedia/knowledgecenter/howto/sync_how_to.aspx.
"Using iPod with Multiple Computers", Retrieved on Sep. 2, 2008, Webpage available at :-http://support.apple.com/kb/HT1202.

\* cited by examiner

*Primary Examiner* — Djenane Bayard
(74) *Attorney, Agent, or Firm* — Alleman Hall McCoy Russell & Tuttle LLP

(57) ABSTRACT

A computing device for managing media content and a method of its operation are provided. The computing device may be configured to execute a computer program including a media manager. The media manager may be configured to present a graphical user interface including a static media menu for enabling a user to select one of an automated mode or a manual mode for managing synchronization of static media content; transfer static media content between the computing device and a remote media device according to a user interaction if the manual mode is selected at the static media menu; transfer static media content according to a predefined programmatic process for the static media content if the automated mode is selected at the static media menu; and transfer dynamic media content between the computing device and the remote media device according to a predefined programmatic process for the dynamic media content.

20 Claims, 3 Drawing Sheets

MANAGING MEDIA SYNCHRONIZATION

BACKGROUND

Digital media content may be transferred between two or more devices through a synchronization process. In some cases, a user may manage this synchronization process between devices via a software application. Some software applications may enable users to select between an automatic syncing mechanism and a manual synching mechanism. One drawback of these current synching mechanisms is that they do not provide sufficient flexibility for some users, which may result in the synchronization of undesired digital media content, or a failure to synchronize desired digital media content.

SUMMARY

A computing device for managing media content and a method of managing media content are provided. In one embodiment, the computing device is configured to execute a computer program that includes a media manager. The media manager is configured to present a graphical user interface via a graphical display. The graphical user interface includes a static media menu for enabling a user to select one of an automated mode or a manual mode for managing synchronization of static media content. The media manager is also configured to transfer static media content between the computing device and a remote media device according to a user interaction if the manual mode is selected at the static media menu, and transfer static media content between the computing device and the remote media device according to a predefined programmatic process for the static media content if the automated mode is selected at the static media menu. The media manager is further configured to transfer dynamic media content between the computing device and the remote media device according to a predefined programmatic process for the dynamic media content if the manual mode or the automated mode is selected at the static media menu.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
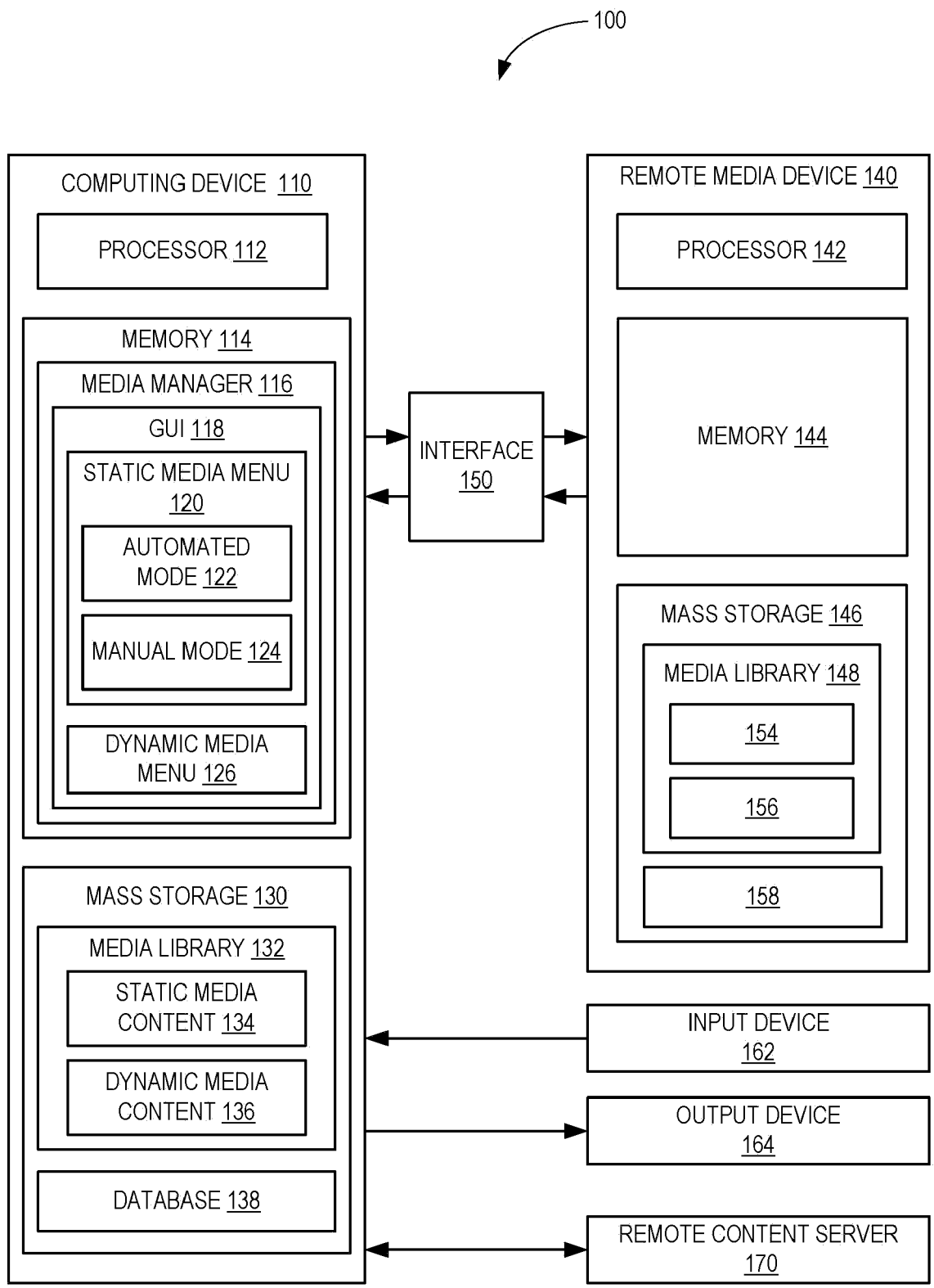
FIG. 1 schematically shows an example embodiment of a computing device for managing media content.

FIG. 1 schematically shows an example embodiment of a computing device 110 for managing media content. Computing device 110 is shown forming a component of a computing system 100, which may further include a remote media device 140. As a non-limiting example, computing device 110 may refer to a personal computer such as a desktop computer, laptop computer, workstation, etc., and remote media device 140 may refer to a mobile media device such as a mobile media player, mobile phone, etc.

Computing device 110 may include a processor 112, memory 114, and mass storage 130. Computing device 110 may include or may communicate with one or more of an input device 162 and an output device 164. Input device 162 may include one or more of a keyboard, keypad, controller, mouse, microphone, or other suitable user input device. Output device 164 may include one or more of a graphical display, audio speakers, or other suitable output device.

Computing device 110 may be configured to execute one or more computer programs. As a non-limiting example, computing device 110 may be configured to execute a computer program including a media manager 116. Media manager 116 may be held in memory 114 as executable instructions that may be executed by processor 112. Mass storage 130 may be configured to store a media library 132. Media library 132 may include media content including static media content 134 and dynamic media content 136.

Dynamic media content 136 may include episodic media content, and static media content 134 may include non-episodic media content. For example, the dynamic media content may include one or more of episodic audio content, episodic video content, episodic textual content, and episodic image content; and the static media content includes one or more of static audio content, static video content, static image content, and static textual content.

In some embodiments, this episodic media content may include podcasts. As a non-limiting example, the dynamic media content is selected from a group consisting of audio podcasts, video podcasts, and textual podcasts; and the static media content is selected from a group consisting of static audio content, static video content, and static textual content. Podcasts may be distinguished from static media content by their ability to be subscribed to by a user. In some embodiments, episodic media content such as podcasts may be periodically downloaded by computing device 110 in a programmatic manner when updated episodic content is made available.

For example, computing device 110 may periodically retrieve updated episodic media content from a remote content server 170 via any suitable communication network. As another example, remote content server 170 may be configured to push updated episodic media content to computing device 110 as subscriber of the content when it become available. As will be described in greater detail with reference to FIG. 2, this updated episodic media content may be subsequently transferred to remote media device 140 as a dynamic media content update.

In some embodiments, media manager 116 may be configured to present a graphical user interface (GUI) 118 via a graphical display. The graphical display is represented schematically in FIG. 1 as output device 164. In some embodiments, graphical user interface 118 may include a static media menu 120 for enabling a user to select one of an automated mode 122 or a manual mode 124 for managing synchronization of static media content. Graphical user interface 118 may further include a dynamic media menu 126 in some embodiments for managing synchronization of dynamic media content. A non-limiting example of graphical user interface 118 is shown in greater detail in FIG. 3.

Remote media device 140 may include a processor 142, memory 144, and mass storage 146. As will be described in greater detail herein, processor 142 of remote media device 140 may be configured to execute instructions that may be held in memory 144 and/or received from computing device 110. Mass storage 146 may be configured to store a media library 148. Media library 148 may include one or more of static media content 154 and dynamic media content 156. Note that static media content 134 of computing device 110 may differ from static media content 154 of remote media device 140 in some conditions; and static media content 134 may be the same as static media content 154 in other conditions. For example, static media content 134 may be identical to static media content 154 during conditions where computing device 110 has been synched with remote media device 140 through the transfer of static media content between them. As another example, static media content 134 may differ from static media content 154 where updated static media content has been recently added to one of the computing device or the remote media device, and synchronization of these devices has not yet been performed. As yet another example, static media content 134 may differ from static media content 154 where the user has selected the manual mode at the static media menu and has not transferred at least select static media content between the computing device and the remote media device. Similarly, dynamic media content 136 of computing device 110 may differ from dynamic media content 156 of remote media device 140 in some conditions; and dynamic media content 136 may be the same as dynamic media content 156 in other conditions.

In some embodiments, computing device 110 and remote media device 140 may communicate with each other via an interface 150. As a non-limiting example, interface 150 may represent a docking station that is configured to receive remote media device 140. As another example, interface 150 may represent a data network, including one or more of a wide area network (e.g., the Internet), a local area network, and a personal area network. It should be appreciated that interface 150 may represent a wired or a wireless communication interface between computing device 110 and remote media device 140.

Media manager 116 of computing device 110 may be configured to transfer static media content between computing device 110 and remote media device 140 (e.g., via interface 150) according to a user interaction if manual mode 124 is selected at static media menu 120. In some embodiments, the user interaction for transferring static media content between two or more devices may include a user manually selecting static media content (e.g., via a graphical selector) to be transferred between computing device 110 and remote media device 130 via input device 162.

As a non-limiting example, the user interaction for transferring static media content from computing device 110 to remote media device 140 may include a "drag and drop" action performed on a graphical user interface of media manager 116, whereby the user selects static media content 134 of media library 132 by a graphical selector (e.g., by clicking a button on a mouse) and drags the selected static media content to a particular location or graphical icon representing media library 148 of remote media device 140. This "drag and drop" action may be reversed by the user to transfer static media content from remote media device 140 to computing device 110.

Media manager 116 may be further configured to transfer static media content between computing device 110 and remote media device 140 according to a predefined programmatic process for the static media content if automated mode 122 is selected at static media menu 120. For example, the predefined programmatic process may be predefined by a user via graphical user interface 118, whereby the user may select some or all of the static media content to be transferred between computing device 110 and remote media device 140. In contrast to the manual mode describe above, the automated mode may be performed without user interaction according to the predefined programmatic process. In this way, the user may setup the predefined programmatic process only a single time to cause multiple transfers of static media content if the automated mode for the static media content is selected.

Media manager 116 may be configured to transfer dynamic media content between computing device 110 and remote media device 140 according to a predefined programmatic process for the dynamic media content if the manual mode or the automated mode is selected at the static media menu. In this way, media manager 116 may transfer dynamic media content between computing device 110 and remote media device 140 according to the predefined programmatic process for the dynamic media content independent of a user selection at the static media menu. It should be appreciated that the predefined programmatic process for the dynamic media content is independent of the predefined programmatic process for the static media content, thereby enabling the user to set different synchronization criteria for static media content and dynamic media content.

This approach enables users to disable the automated mode for the static media content to enable the user to retain different static media content on each of the computing device and the remote media device, while also enabling the user to rely on a programmatic process for the dynamic media content. In this way, dynamic media content may be maintained up to date on each device and optionally eliminating out-of-date dynamic media content that is no longer relevant to the user.

In some embodiments, the media manager may be configured to transfer static media content between the computing device and the remote media device by one or more of: transferring static media content 134 from computing device 110 to remote media device 140, and transferring static media content 154 from remote media device 140 to computing device 110. In some embodiments, the media manager may be configured to transfer dynamic media content between computing device 110 and the remote media device 140 by one or more of: transferring dynamic media content 136 from computing device 110 to the remote media device 140, and transferring dynamic media content 156 from remote media device 140 to computing device 110. In this way, both static media content and dynamic media content may be transferred between computing device 110 and remote media device 140 in either direction.

Where static media content 154 is to be transferred from remote media device 140 to computing device 110, computing device 110 may initiate the transfer by transmitting a transfer request to remote media device 140 via interface 150. The transfer request may be executable by processor 142 of remote media device 140 to transfer static media content 154 to computing device 110. Similarly, where dynamic media content 156 is to be transferred from remote media device 140 to computing device 110, computing device 110 may initiate the transfer by transmitting a transfer request to remote media device 140 via interface 150.

In some embodiments, media manager 116 may be configured to transmit content removal instructions to remote media device 140 responsive to removal of static media content from computing device 110 if automated mode 122 is selected at static media menu 120. The content removal instructions may be executable by remote media device 140 to remove corresponding static media content from the remote media device 140. For example, where static media content 134 is the same as static media content 154, and static media content 134 is removed from computing device 110 (e.g., by user interaction), then static media content 154 may be removed from remote media device 140 by computing device 110 transmitting the content removal instructions to remote media device 140.

However, media manager 116 may be configured to permit the static media content to be retained at remote media device 140 responsive to the removal of the static media content at the computing device if manual mode 124 is selected at static media menu 120. Static media content that is retained at remote media device 140 even after the corresponding media content at computing device 110 has been removed may be referred to as "orphaning" of the static media content at the remote media device. Through selection of the manual mode, a user may select whether computing device 110 transmits the content removal request to the remote media device responsive to removal of static media content from computing device 110, thereby enabling the user to retain static media content at remote media device 140 even after it has been removed (e.g., deleted) from computing device 110.

In some embodiments, media manager 116 may be configured to transmit a dynamic media content update to remote media device 140 if one or more of manual mode 124 and automated mode 122 are selected at static media menu 120. The dynamic media content update may include updated dynamic media content and update instructions. The update instructions may be executable by remote media device 140 to replace dynamic media content at remote media device 140 with the updated dynamic media content. For example, where an updated podcast becomes available to computing device 110, a corresponding previous podcast stored at remote media device 140 may be updated by transmission of the dynamic media content update. In this way, dynamic media content 156 may be updated at remote media device 140 regardless of whether the user selects automated mode 122 or manual mode 124 at static media menu 120.

In some embodiments, static media content 134 and/or dynamic media content 136 may include associated meta data. This meta data may include one or more of a title of the associated media content, an author of the associated media content, a number of times the associated media content has been accessed (e.g., played) by a user, a user's rating of the associated media content, among others.

In some embodiments, media manager 116 may be configured to transmit a meta data update to remote media device 140 if one or more of manual mode 124 and automated mode 122 are selected at static media menu 120. The meta data update may include updated meta data and update instructions. The update instructions may be executable by the remote media device to replace meta data associated with static media content 154 stored at the remote media device 140 with the updated meta data. In this way, meta data associated with static media content may be updated even if a user has selected the manual mode at the static menu, thereby enabling a user to maintain synchronization of meta data between devices while still retaining control over the static media content that inhabits each device.

In some embodiments, media manager 116 may be configured to transmit the meta data update from the computing device to the remote media device responsive to an update of the meta data at the computing device. For example, a user may update the meta data associated with static media content 134 at computing device 110 by changing a title of static media content. In some embodiments, the meta data may be updated by media manager 116 on behalf of the user. For example, meta data indicating a number of times that the user has accessed static media content 134 may be updated by media manager 116 each time the user accesses static media content 134.

In some embodiments, automated mode 122 is a first automated mode of a plurality of automated modes, and the predefined programmatic process for the static media content is a first predefined programmatic process of a plurality of predefined programmatic processes. As such, the static media menu may further include a second automated mode. The media manager may be further configured to transfer a subset of the static media content between the computing device and the remote media device according to a second predefined programmatic process for the static media content if the second automated mode is selected at the static media menu. These multiple predefined programmatic processes will be described in greater detail with reference to FIG. 3.

In some embodiments, a database 138 exists in mass storage 130, which describes the location of all media content located at one or more of computing device 110 and remote media device 140. Similarly, remote media device 140 may include its own database which retains information pertaining to the media content that is stored at the remote media device, as well as a subset of the meta data stored in database 138 for the media content residing at the remote media device.

In some embodiments, database 138 contains a table (referred to as a "device content table") which keeps track of each item of media content transferred to the remote media device, an identifier assigned to each item of media content, and a reference to the original item of media content. This table creates a unique linkage in the device content table between a known item of media content at computing device 110 and a corresponding item of media content at the remote media device.

For example, when a user makes edits to meta data at computing device 110 for media content that has been previously transferred to remote media device 140, media manager 116 can determine that there are recent changes to the meta data that can be transmitted to the corresponding table entry on the remote media device as indicated at database 158.

When the automated mode is selected at the static media menu, the removal of an item of static media content from computing device 110 results in subsequent removal of that same item of media content from the remote media device, because the media manager will compare the list of items on the remote media device with those that should "currently" be on the device according to the automated mode, and will find that the remote media device contains a previously synchronized item of media content which should no longer be there.

If the manual mode is selected at the static media menu, the removal step is not performed at the remote media device, and instead, the item of media content in a device content table at remote media device 140 is unlinked from its corresponding entry in the table of database 138 which defines locally available content at computing device 110. At this point, the media content on the remote media device that has been removed from the computing device is "orphaned" from any relationship with the computing device, and no longer receives meta data updates from the computing device in the future, but the media content is permitted to remain on the remote media device. This approach may be advantageous in certain scenarios, such as when the media content is a large file, which the user does not want to retain at the computing device.

Figure 2:
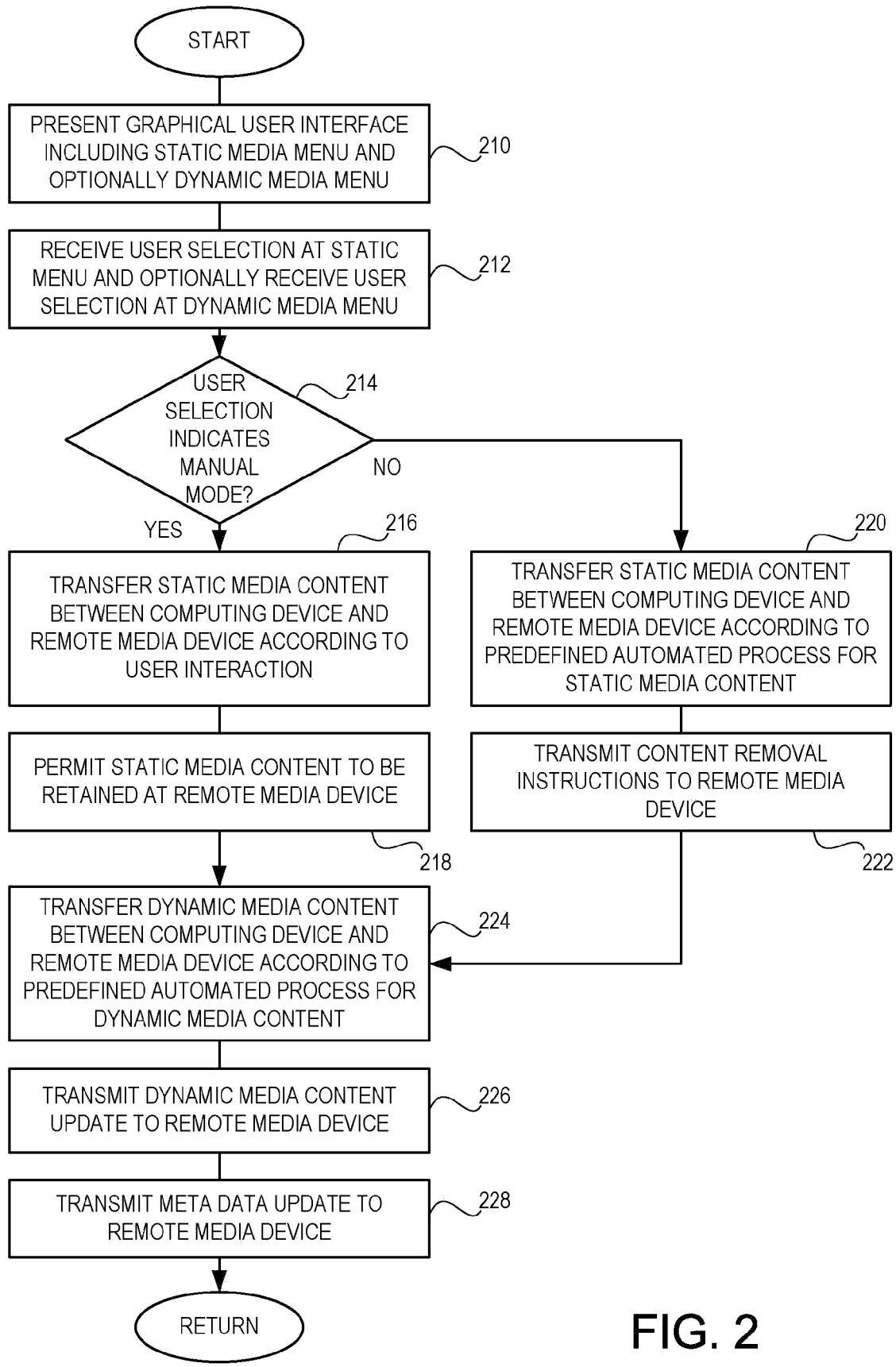
FIG. 2 is a flow diagram showing an example embodiment of a method for managing media content between a computing device and a remote media device.

FIG. 2 is a flow diagram showing an example embodiment of a method for managing media content between a computing device and a remote media device. It should be appreciated that the method of FIG. 2 may be performed by computing device 110 of computing system 100, for example.

Figure 3:
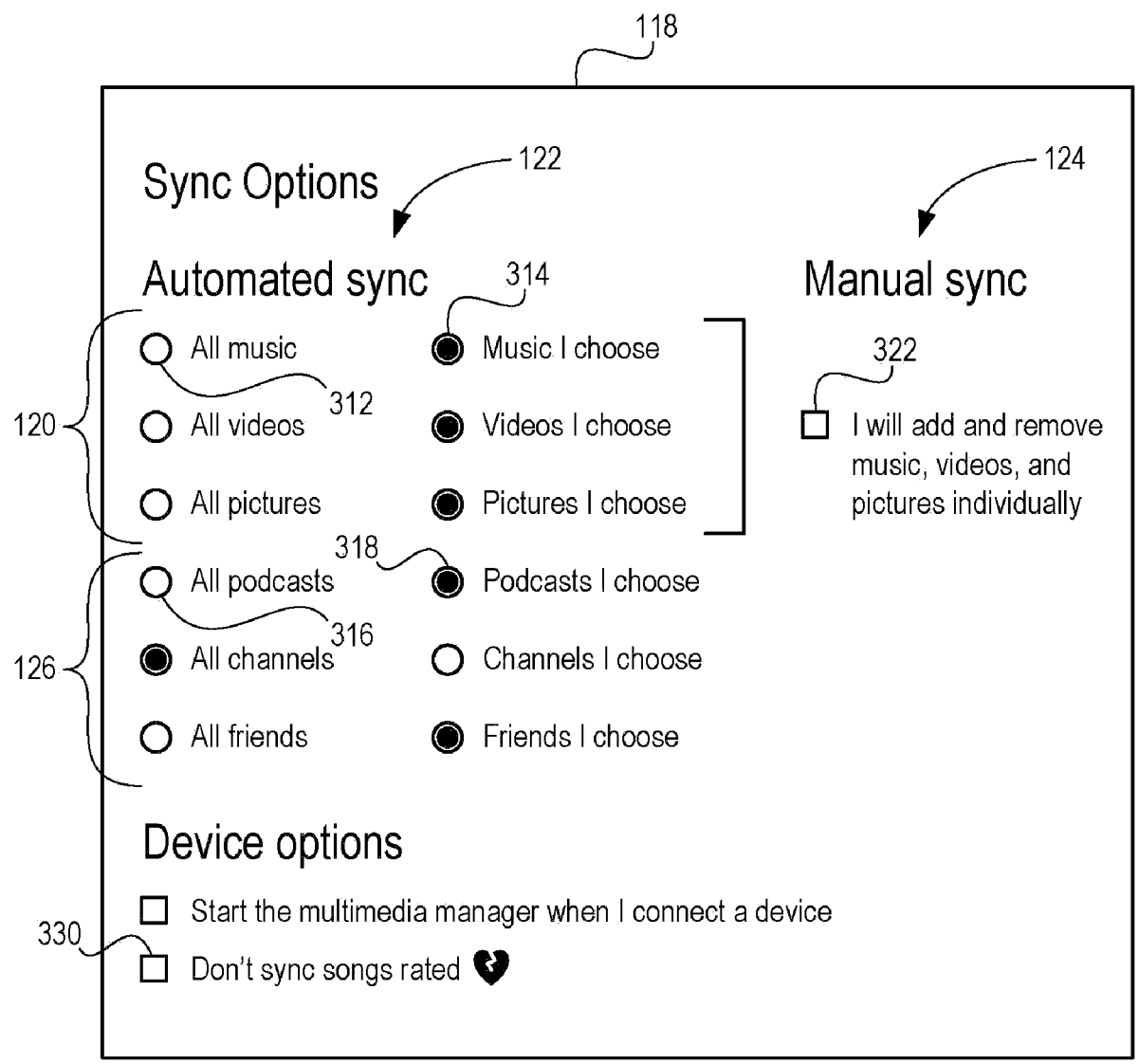
FIG. 3 shows an example embodiment of a graphical user interface that may be presented via a graphical display.

At 210, the method may include presenting a graphical user interface via a graphical display, where the graphical user interface includes a static media menu for enabling a user to select one of an automated mode or a manual mode for managing synchronization of static media content. In some embodiments, the graphical user interface may optionally include a dynamic media menu as shown in FIG. 3, for example.

At 212, the method may include receiving a user selection at the static media menu, where the user selection indicates one of the automated mode or the manual mode. The method at 212 may optionally include receiving a user selection at the dynamic media menu in addition to the user selection received at the static media menu.

If the user selection received at 212 indicates the manual mode as judged at 214, then the method at 216 may include transferring static media content between the computing device and the remote media device according to a user interaction. As described above with reference to FIG. 1, this user interaction may include a "drag and drop" action or other suitable user interaction.

Alternatively, if the user interaction received at 212 indicates the automated mode, then the method at 220 may include transferring static media content between the computing device and the remote media device according to a predefined programmatic process for the static media content. As described above with reference to FIG. 1, the predefined programmatic process may be set by a user in some examples.

In some embodiments, the automated mode may be a first automated mode of a plurality of automated modes, and the predefined programmatic process for the static media content may be a first predefined programmatic process of a plurality of predefined programmatic processes. As such, the static media menu may further include a second automated mode, and the method may include transferring a subset of the static media content between the computing device and the remote media device according to a second predefined programmatic process for the static media content if the second automated mode is selected at the static media menu.

At 222, the method may include transmitting content removal instructions to the remote media device if the user selection indicates the automated mode. The content removal instructions may be executable by the remote media device to remove corresponding static media content from the remote media device. In some embodiments, content removal instructions may be transmitted from the computing device to the remote media device responsive to removal of the static media content from the computing device. In this way, the computing device and the remote media device may be synchronized with respect to the static media content that is stored on each. Alternatively, the method at 218 may include permitting the static media content to be retained at the remote media device responsive to removal of the static media content at the computing device if the user selection indicates the manual mode. In this way, static media content may be orphaned at the remote media device even after the corresponding static media content is removed from the computing device.

At 224, the method may include transferring dynamic media content between the computing device and the remote media device according to a predefined programmatic process for the dynamic media content if the user selection indicates either one of the manual mode or the automated mode.

As previously described with reference to FIG. 1, the dynamic media content may include episodic media content and the static media content may include non-episodic media content. For example, the dynamic media content may include one or more of episodic audio content, episodic video content, and episodic textual content; and the static media content includes one or more of static audio content, static video content, and static image content. In some embodiments, the dynamic media content is selected from a group consisting of audio podcasts, video podcasts, and textual podcasts; and the static media content is selected from a group consisting of static audio content, static video content, and static textual content.

It should be appreciated that transferring the static media content between the computing device and the remote media device by one or more of: transferring the static media content from the computing device to the remote media device and transferring the static media content from the remote media device to the computing device. Similarly, transferring the dynamic media content between the computing device and the remote media device by one or more of: transferring the dynamic media content from the computing device to the remote media device and transferring the dynamic media content from the remote media device to the computing device.

At 226, the method may include transmitting a dynamic media content update to the remote media device if either one of the manual mode and the automated mode are indicated by the user selection. The dynamic media content update may include updated dynamic media content and update instructions. The update instructions may be executable by the remote media device to replace the dynamic media content at remote media device with the updated dynamic media content.

At 228, the method may include transmitting a meta data update to the remote media device if the user selection indicates either one of the manual mode and the automated mode. The meta data update may include updated meta data and update instructions. The update instructions may be executable by the remote media device to replace meta data associated with static media content stored at the remote media device with the updated meta data. In some embodiments, transmitting the meta data update from the computing device to the remote media device may be performed responsive to an update of the meta data at the computing device. For example, as described above with reference to FIG. 1, a user may manually update meta data at computing device 110 or the meta data may be updated on behalf of the user by media manager 116.

FIG. 3 shows an example embodiment of graphical user interface 118 that may be presented via a graphical display. Graphical user interface 118 includes static media menu 120 and dynamic media menu 126. Static media menu 120 includes automated mode 122 and a manual mode 124 which may be selected by a user.

Referring specifically to static media menu 120, a user may select from one or more different automated modes having different predefined programmatic processes. For example, a first automated mode may be selected for static music content by selecting selector 312. A second automated mode may be selected for the static music content by selecting selector 314. The second automated mode may cause the media manager to transfer only a subset of the static music content between the computing device and the remote media device according to a second predefined programmatic process, which may be predefined by the user. By contrast, the first automated mode may cause the media manager to transfer all static music content between the computing device and the remote media device.

Static media menu 120 may include similar automated modes for other static media content, including static video content and static image content (depicted as "pictures" in FIG. 3). Alternatively, the user may select the manual mode for the static media content by selecting selector 322. In this particular example, manual mode 124 is applied to all of the static media content when selector 322 is selected. However, in other embodiments, each type of static media content may include its own manual mode selector.

Dynamic media menu 126 may include one or more selectable automated modes. For example, with respect to podcasts, a user may select between a first automated mode by selecting selector 316 and a second automated mode by selecting selector 318. The first automated mode may cause the media manager to transfer all podcasts between the computing device and the remote media device according to a first predefined programmatic process. The second automated mode may cause the media manager to transfer only a subset of the podcasts specified by a second predefined programmatic process, which may be set by the user to transfer less than all of the podcasts. Other dynamic media content may include two or more selectors for enabling the user to select its automated mode. For example, channels and friends may be transferred by the media manager according to a selected one of the two or more automated modes of the dynamic media menu. Graphical user interface 118 may include other selectable automated modes for static media content. For example, a user may select selector 330 to cause the media manager to refrain from synching static media content that has been rated in particular way by the user (e.g., with a broken heart).

The approaches described herein for managing media content recognize that synchronization behavior for static media content may differ from synchronization behavior for dynamic media content, since static media content may constitute a permanent part of a user's media library, whereas dynamic media content may be temporal in nature. As such, the above approaches for managing media content draws a distinction between static media content and dynamic media content with respect to manual and automated modes of operation.

As described herein, a processor (e.g., such as processors 112 and 142) may include one or more physical devices configured to execute one or more instructions. For example, a processor may be configured to execute one or more instructions that are part of one or more programs, routines, objects, components, data structures, or other logical constructs. Such instructions may be implemented to perform a task, implement a data type, change the state of one or more devices, or otherwise arrive at a desired result. A processor may include one or more processors that are configured to execute software instructions. Additionally or alternatively, a processor may include one or more hardware or firmware logic machines configured to execute hardware or firmware instructions. A processor may optionally include individual components that are distributed throughout two or more devices, which may be remotely located in some embodiments.

As described herein, memory (e.g., such as memory 114 and 144) may include one or more physical devices configured to hold data and/or instructions that, when executed by the logic subsystem, cause the logic subsystem to implement the herein described methods and processes. Memory may include removable media and/or built-in devices. Memory may include optical memory devices, semiconductor memory devices, and/or magnetic memory devices, among others. Memory may include portions with one or more of the following characteristics: volatile, nonvolatile, dynamic, static, read/write, read-only, random access, sequential access, location addressable, file addressable, and content addressable. Further, it should be appreciated that mass storage 130 and 146 may be provided as a form of memory in accordance with the above description.

It will be appreciated that the devices described herein (e.g., including computing device 110 and remote media device 140) may be any suitable device configured to execute the programs described herein. For example, these devices may be a mainframe computer, personal computer, laptop computer, portable data assistant (PDA), computer-enabled wireless telephone, networked computing device, or other suitable computing device, and may be connected to each other via computer networks, such as the Internet. These devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more devices described herein, and is meant to encompass individual or groups of executable files, data files, libraries, drivers, scripts, database records, etc. It will be appreciated that computer-readable media may be provided having program instructions stored thereon, which upon execution by a device, cause the device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing device for managing media content, the computing device configured to execute a computer program, comprising:
  a media manager configured to:
    present a graphical user interface via a graphical display, the graphical user interface including a static media menu configured to receive a user selection of one of an automated mode or a manual mode for managing synchronization of static media content, and a dynamic media menu configured to receive a user selection of an automated mode for managing synchronization of dynamic media content, the static media content including non-episodic media content and the dynamic media content including episodic media content subscribed to by a user;
    transfer static media content between the computing device and a remote media device according to a user interaction if the manual mode is selected at the static media menu;
    transfer static media content between the computing device and the remote media device according to a predefined programmatic process for the static media content if the automated mode is selected at the static media menu; and
    transfer dynamic media content between the computing device and the remote media device according to a predefined programmatic process for the dynamic media content, independent of the predefined programmatic process for the static media content, if the automated mode is selected in the dynamic media menu, independent of the user selection at the static media menu.

2. The computing device of claim 1, where the dynamic media content includes one or more of episodic audio content, episodic video content, and episodic textual content; and where the static media content includes one or more of static audio content, static video content, and static image content.

3. The computing device of claim 1, where the dynamic media content is selected from a group consisting of audio podcasts, video podcasts, and textual podcasts; and
where the static media content is selected from a group consisting of static audio content, static video content, and static textual content.

4. The computing device of claim 1, where the media manager is configured to:
transfer the static media content between the computing device and the remote media device by one or more of:
transferring the static media content from the computing device to the remote media device and transferring the static media content from the remote media device to the computing device; and
transfer the dynamic media content between the computing device and the remote media device by one or more of:
transferring the dynamic media content from the computing device to the remote media device and transferring the dynamic media content from the remote media device to the computing device.

5. The computing device of claim 1, where the media manager is further configured to:
transmit content removal instructions to the remote media device responsive to removal of the static media content from the computing device if the automated mode is selected at the static media menu, the content removal instructions being executable by the remote media device to remove corresponding static media content from the remote media device; and
permit the static media content to be retained at the remote media device responsive to removal of the static media content at the computing device if the manual mode is selected at the static media menu.

6. The computing device of claim 1, where the media manager is further configured to:
transmit a dynamic media content update to the remote media device if one or more of the manual mode and the automated mode are selected at the static media menu, the dynamic media content update including updated dynamic media content and update instructions, the update instructions being executable by the remote media device to replace the dynamic media content at the remote media device with the updated dynamic media content.

7. The computing device of claim 1, where the media manager is further configured to:
transmit a meta data update to the remote media device if one or more of the manual mode and the automated mode are selected at the static media menu, the meta data update including updated meta data and update instructions, the update instructions being executable by the remote media device to replace meta data associated with static media content stored at the remote media device with the updated meta data.

8. The computing device of claim 7, where the media manager is configured to transmit the meta data update from the computing device to the remote media device responsive to an update of the meta data at the computing device.

9. The computing device of claim 1, where the automated mode is a first automated mode of a plurality of automated modes, and the predefined programmatic process for the static media content is a first predefined programmatic process of a plurality of predefined programmatic processes;

where the static media menu further includes a second automated mode; and
where the media manager is further configured to transfer a subset of the static media content between the computing device and the remote media device according to a second predefined programmatic process for the static media content if the second automated mode is selected at the static media menu.

10. A method for managing media content between a computing device and a remote media device, the method comprising:
presenting a graphical user interface via a graphical display, the graphical user interface including a static media menu configured to receive a user selection of one of an automated mode or a manual mode for managing synchronization of static media content, and a dynamic media menu configured to receive a user selection of an automated mode for managing synchronization of dynamic media content, the static media content including non-episodic media content and the dynamic media content including episodic media content subscribed to by a user;
receiving a user selection at the static media menu, the user selection indicating one of the automated mode or the manual mode for the static media content;
receiving a user selection at the dynamic media menu, the user selection indicating a selected automated mode for the dynamic media content;
transferring static media content between the computing device and the remote media device according to a user interaction if the manual mode is indicated by the user selection;
transferring static media content between the computing device and the remote media device according to a predefined programmatic process for the static media content if the automated mode is indicated by the user selection; and
transferring dynamic media content between the computing device and the remote media device according to a predefined programmatic process for the dynamic media content, independent of the predefined programmatic process for the static media, if the automated mode is selected in the dynamic media menu, independent of the user selection at the static media menu.

11. The method of claim 10, where the dynamic media content includes one or more of episodic audio content, episodic video content, and episodic textual content; and
where the static media content includes one or more of static audio content, static video content, and static image content.

12. The method of claim 10, where the dynamic media content is selected from a group consisting of audio podcasts, video podcasts, and textual podcasts; and
where the static media content is selected from a group consisting of static audio content, static video content, and static textual content.

13. The method of claim 10, further comprising:
transferring the static media content between the computing device and the remote media device by one or more of:
transferring the static media content from the computing device to the remote media device and transferring the static media content from the remote media device to the computing device; and
transferring the dynamic media content between the computing device and the remote media device by one or more of:

transferring the dynamic media content from the computing device to the remote media device and transferring the dynamic media content from the remote media device to the computing device.

14. The method of claim 10, further comprising:

transmitting content removal instructions to the remote media device responsive to removal of the static media content from the computing device if the user selection indicates the automated mode, the content removal instructions being executable by the remote media device to remove corresponding static media content from the remote media device; and permitting the static media content to be retained at the remote media device responsive to removal of the static media content at the computing device if the user selection indicates the manual mode.

15. The method of claim 10, further comprising:

transmitting a dynamic media content update to the remote media device if either one of the manual mode and the automated mode are indicated by the user selection, the dynamic media content update including updated dynamic media content and update instructions, the update instructions being executable by the remote media device to replace the dynamic media content at the remote media device with the updated dynamic media content.

16. The method of claim 10, further comprising:

transmitting a meta data update to the remote media device if the user selection indicates either one of the manual mode and the automated mode, the meta data update including updated meta data and update instructions, the update instructions being executable by the remote media device to replace meta data associated with static media content stored at the remote media device with the updated meta data.

17. The method of claim 16, where transmitting the meta data update from the computing device to the remote media device is performed responsive to an update of the meta data at the computing device.

18. The method of claim 10, where the automated mode is a first automated mode of a plurality of automated modes, and the predefined programmatic process for the static media content is a first predefined programmatic process of a plurality of predefined programmatic processes;

where the static media menu further includes a second automated mode; and where the method further comprises transferring a subset of the static media content between the computing device and the remote media device according to a second predefined programmatic process for the static media content if the second automated mode is selected at the static media menu.

19. A method for managing media content between a computing device and a remote media device, the method comprising:

presenting a graphical user interface via a graphical display, the graphical user interface including a static media menu for enabling a user to select one of an automated mode or a manual mode for managing synchronization of static media content and a dynamic media menu for enabling a user to select an automated mode for managing synchronization of dynamic media content, the static media content including non-episodic media content and the dynamic media content including episodic media content subscribed to by a user;

receiving a user selection at the static media menu, the user selection indicating one of the automated mode or the manual mode;

transmitting static media content removal instructions to the remote media device responsive to removal of the static media content from the computing device if the user selection indicates the automated mode, the static media content removal instructions being executable by the remote media device to remove corresponding static media content from the remote media device;

permitting the static media content to be retained at the remote media device responsive to removal of the static media content at the computing device if the user selection indicates the manual mode; and transmitting a meta data update to the remote media device if the static media content has been retained at the remote media device, the meta data update including updated meta data and update instructions, the update instructions being executable by the remote media device to replace meta data associated with static media content retained at the remote media device with the updated meta data.

20. The method of claim 19, further comprising:

transferring the static media content from the computing device to the remote media device according to a user interaction if the manual mode is indicated by the user selection;

transferring the static media content from the computing device to the remote media device according to a predefined programmatic process for the static media content if the automated mode is indicated by the user selection; and transferring dynamic media content between the computing device and the remote media device according to a predefined programmatic process for the dynamic media content if the user selection indicates either one of the manual mode or the automated mode at the static media menu;

where the dynamic media content includes episodic media content and where the static media content includes non-episodic media content.

* * * * *